United States Patent
Shan et al.

(10) Patent No.: US 11,964,302 B2
(45) Date of Patent: Apr. 23, 2024

(54) SORTING MACHINE

(71) Applicant: BEIJING JINGDONG QIANSHI TECHNOLOGY CO., LTD., Beijing (CN)

(72) Inventors: Wenjun Shan, Beijing (CN); Xu Wang, Beijing (CN); Guopeng Wang, Beijing (CN); Xiaochong Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 237 days.

(21) Appl. No.: 17/616,254

(22) PCT Filed: Mar. 11, 2020

(86) PCT No.: PCT/CN2020/078831
§ 371 (c)(1),
(2) Date: Dec. 3, 2021

(87) PCT Pub. No.: WO2020/244271
PCT Pub. Date: Dec. 10, 2020

(65) Prior Publication Data
US 2022/0241822 A1    Aug. 4, 2022

(30) Foreign Application Priority Data
Jun. 3, 2019    (CN) .......................... 201910477460.6

(51) Int. Cl.
*B07C 3/02* (2006.01)
*B07C 3/00* (2006.01)
*B65G 1/04* (2006.01)

(52) U.S. Cl.
CPC ............... *B07C 3/02* (2013.01); *B07C 3/003* (2013.01); *B65G 1/0492* (2013.01)

(58) Field of Classification Search
None
See application file for complete search history.

(56) References Cited

U.S. PATENT DOCUMENTS 7,861,844 B2 *    1/2011    Hayduchok ............. B65G 1/04
                                                                198/370.1
2008/0277243 A1    11/2008   Hayduchok et al.
(Continued)

FOREIGN PATENT DOCUMENTS

CN    101078214 A    11/2007
CN    201480573 U     5/2010
(Continued)

OTHER PUBLICATIONS

Notice of Reasons for Refusal dated Dec. 20, 2022 for Japanese Patent Application No. 2021-567880.
(Continued)

*Primary Examiner* — Kavel Singh
(74) *Attorney, Agent, or Firm* — Qinghong Xu

(57) ABSTRACT

Disclosed is a sorting machine, comprising a rack, two rail units which are both mounted on the rack and are symmetrical to each other, and a sorting cart. The rail units comprise: a transverse rail assembly, wherein the transverse rail assembly comprises a plurality of transverse rails and a plurality of reversing mechanisms, and the transverse rails and the reversing mechanisms are alternately arranged along a straight line; and a plurality of vertical rails which are parallel to each other, wherein the vertical rails and the reversing mechanisms are arranged in one-to-one correspondence. The sorting cart is switched to a rail by means of the reversing mechanisms, and a conveying direction of a conveying assembly is different from a traveling direction of the sorting cart.

16 Claims, 16 Drawing Sheets

(56) References Cited

U.S. PATENT DOCUMENTS

2010/0242783 A1    9/2010    Oguro et al.
2017/0182618 A1    6/2017    Xue et al.

FOREIGN PATENT DOCUMENTS

| | | |
|---|---|---|
| CN | 102673932 A | 9/2012 |
| CN | 106276108 A | 1/2017 |
| CN | 106956887 A | 7/2017 |
| CN | 206485919 U | 9/2017 |
| CN | 107635896 A | 1/2018 |
| CN | 108033184 A | 5/2018 |
| CN | 108311399 A | 7/2018 |
| CN | 108584255 A | 9/2018 |
| CN | 108706266 A | 10/2018 |
| CN | 208022283 U | 10/2018 |
| CN | 108772304 A | 11/2018 |
| CN | 109230124 A | 1/2019 |
| CN | 109264284 A | 1/2019 |
| CN | 208345158 U | 1/2019 |
| CN | 109334675 A | 2/2019 |
| CN | 208761525 U | 4/2019 |
| CN | 109823788 A | 5/2019 |
| JP | H07-076241 A | 3/1995 |
| JP | H11301994 A | 11/1999 |
| JP | 2002030601 A | 1/2002 |
| JP | 2010515570 A | 5/2010 |
| WO | 2018157095 A1 | 8/2018 |

OTHER PUBLICATIONS

The First Office Action dated Mar. 17, 2022 of Chinese Patent No. 201910477460.6.
The International Search Report dated May 11, 2020 for PCT international application No. PCT/CN2020/078831.
Notice of Allowance dated Jul. 18, 2023 of Chinese Application No. 201910477460.6.

\* cited by examiner

SORTING MACHINE

CROSS-REFERENCE

The present disclosure claims the priority to the Chinese Patent Application No. 201910477460.6, entitled "SORTING MACHINE", filed on Jun. 3, 2019, the entire contents of which are hereby incorporated by reference.

TECHNICAL FIELD

The present disclosure generally relates to the field of logistics technology, and in particular, relates to a sorting machine.

BACKGROUND

Almost all existing sorting machines are cross-belt sorting machines. The cross-belt sorting machine is arranged in a horizontal ring structure on the ground, which occupies a large area. This sorting machine almost only uses a horizontal plane area on the ground in space utilization, and the space utilization rate is low. This sorting machine is especially not suitable for small sorting places.

The information disclosed in the Background section above is only for enhancing the understanding of the background of the present disclosure, and thus may include information that does not constitute prior art known to those of ordinary skill in the art.

SUMMARY

A series of simplified concepts are introduced in the content of the disclosure, which will be explained in further detail in the detailed description section. The content of the present disclosure does not mean an attempt to limit the key features and necessary technical features of the technical solution that is claimed, let alone an attempt to determine the protection scope of the technical solution that is claimed.

One of the main objectives of the present disclosure is to overcome at least one of the above-mentioned drawbacks of the related art and provides a sorting machine, including: a rack, two rail units both installed on the rack and symmetrical to each other, and a sorting cart;

the rail unit including:
a transverse rail assembly, the transverse rail assembly including a plurality of transverse rails and a plurality of reversing mechanisms, wherein the transverse rail and the reversing mechanism are alternately arranged along a straight line, and the plurality of transverse rails are flush with each other; and
a plurality of mutually parallel vertical rails, wherein the vertical rails and the reversing mechanisms are arranged in a one-to-one correspondence, and one end of the vertical rail extends to the corresponding reversing mechanism;
the sorting cart including:
a frame arranged between the two rail units;
a traveling mechanism installed on the frame and capable of traveling along the transverse rail and the vertical rail of two rail units;
a conveying assembly arranged above the frame and capable of carrying and conveying articles,
wherein, the reversing mechanism is used to switchably connect one transverse rail to one of the transverse rail and the vertical rail adjacent to the transverse rail, the sorting cart switches rails through the reversing mechanism, and a conveying direction of the conveying assembly is different from a traveling direction of the sorting cart.

According to an embodiment of the present disclosure, the transverse rail assembly is provided with two sets, and the vertical rail is provided between two sets of the transverse rail assemblies and two ends thereof respectively extend to the reversing mechanisms of the two sets of the transverse rail assemblies.

According to an embodiment of the present disclosure, the reversing mechanism includes:
a steering member, including a bottom plate slidably connected to the rack and a straight rail and a curved rail arranged on an identical surface of the bottom plate;
a driving mechanism configured to drive the steering member to slide;
wherein, the curved rail and the straight rail are successively arranged along a sliding direction of the bottom plate, the straight rail is parallel to the transverse rail and capable of connecting two adjacent transverse rails, the curved rail is capable of connecting adjacent one transverse rail and one vertical rail.

According to an embodiment of the present disclosure, an included angle between the sliding direction of the bottom plate and an extending direction of the vertical rail is equal to an included angle between the sliding direction of the bottom plate and the extending direction of the transverse rail.

According to an embodiment of the present disclosure, an end surface of the transverse rail and an end surface of the straight rail are inclined surfaces parallel to each other, and the end surface of the transverse rail and the end surface of the straight rail are both parallel to the sliding direction of the bottom plate.

According to an embodiment of the present disclosure, the straight rail is arranged at one end of the bottom plate away from the vertical rail, and the curved rail is arranged at one end of the bottom plate close to the vertical rail.

According to an embodiment of the present disclosure, the reversing mechanism further includes:
a linear guide rail, installed between the rack and the bottom plate, and configured to guide the bottom plate to slide along a straight line.

According to an embodiment of the present disclosure, the bottom plate is provided with a slot that is not parallel to a sliding direction of the steering member;
the driving mechanism includes:
a speed reducer, including an input shaft and an output shaft;
a third motor, including a main shaft that is drivingly connected to the input shaft;
a pendulum rod, having one end vertically connected to the output shaft;
a pendulum wheel, installed at the other end of the pendulum rod and located in the slot, and capable of rolling along the slot;
wherein, when the pendulum rod drives the pendulum wheel to swing, the pendulum wheel is capable of driving the steering member to slide.

According to an embodiment of the present disclosure, the curved rail is a smooth arc, and one end of the curved rail faces a direction parallel to an extending direction of the straight rail, the other end of the curved rail faces a direction perpendicular to the extending direction of the straight rail and away from the straight rail.

According to an embodiment of the present disclosure, each rail in the rail unit includes a spline and a limit guide rail parallel to the spline:

the traveling mechanism includes a plurality of wheel sets, and each of the wheel sets includes a crawling gear that is capable of actively rotating and a guide wheel arranged next to the crawling gear and coaxial with a preset crawling gear;

wherein, the crawling gear is arranged between the spline and the limit guide rail, and the crawling gear is meshed with the spline and is capable of rolling along the spline, and the guide wheel is capable of rolling along the limit guide rail.

According to an embodiment of the present disclosure, a width of the spline is smaller than a width of the limit guide rail, so as to make way for the guide wheel.

According to an embodiment of the present disclosure, each of the wheel sets further includes a wheel shaft, and the wheel shafts are parallel to each other;

each wheel set has two crawling gears and two guide wheels, the two crawling gears are respectively arranged at two ends of the wheel shafts, and two guide wheels are arranged between the two crawling gears and are respectively close to the two crawling gears.

According to an embodiment of the present disclosure, the transverse rail is arranged horizontally, and the vertical rail is arranged vertically.

According to an embodiment of the present disclosure, the sorting machine further includes a plurality of logistics boxes arranged on the rack, and a plurality of the logistics boxes are arranged on a side of the vertical rail away from the sorting cart.

BRIEF DESCRIPTION OF THE DRAWINGS

By considering the following detailed description of the preferred embodiments of the present disclosure in conjunction with the accompanying drawings, various objectives, features and advantages of the present disclosure will become more apparent. The drawings are merely exemplary illustrations of the present disclosure and are not necessarily drawn to scale. In the drawings, the same reference numerals always refer to the same or similar parts. In the drawings.

DETAILED DESCRIPTION

Figure 1:
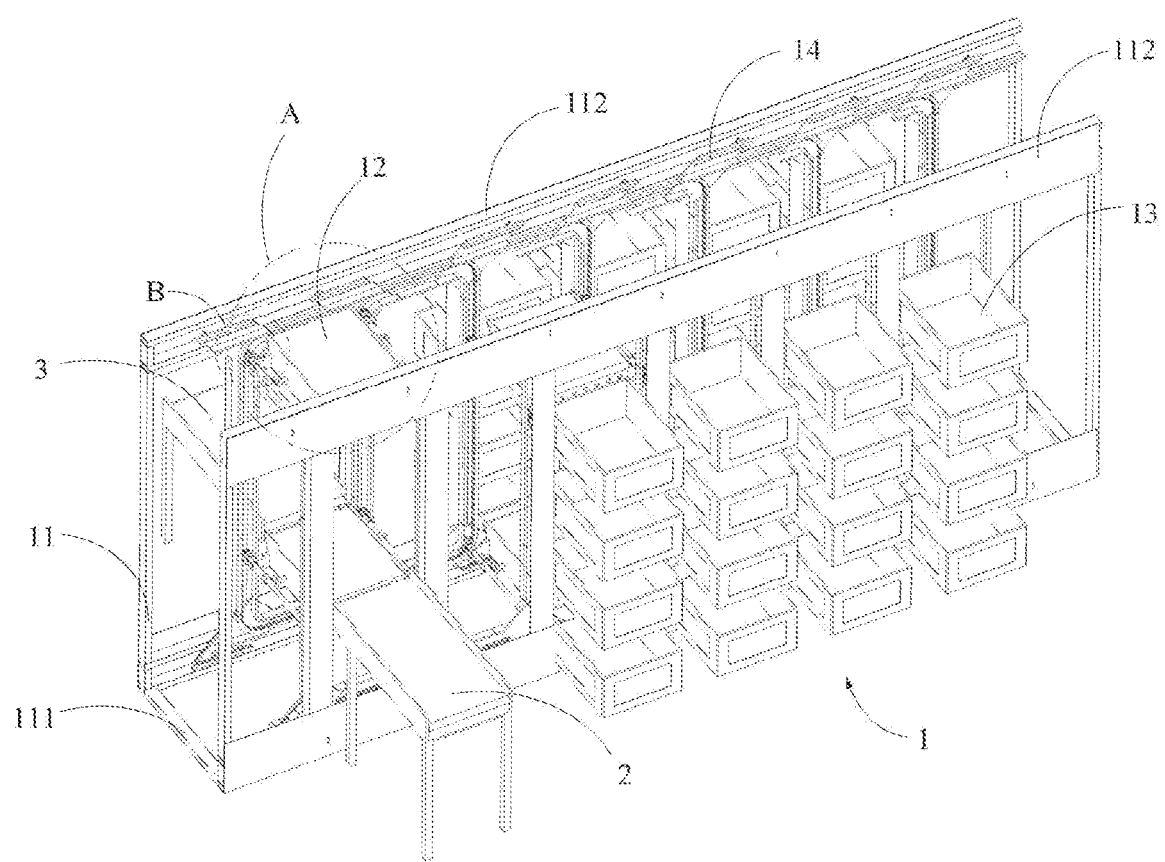
FIG. 1 is a three-dimensional schematic diagram showing a sorting machine according to an exemplary embodiment.

Exemplary embodiments will now be described more fully with reference to the accompanying drawings. However, the embodiments can be implemented in a variety of forms and should not be construed as being limited to the examples set forth herein; rather, these embodiments are provided so that the present disclosure will be more comprehensive and complete, so as to fully convey the idea of the exemplary embodiments to those skilled in this art. The same reference numerals in the figures indicate the same or similar structures, and thus their detailed descriptions will be omitted.

Referring to FIG. 1, FIG. 1 shows a sorting machine 1 in this embodiment. The sorting machine 1 includes a rack 11, a rail system 14, a sorting cart 12 and a plurality of logistics boxes 13. The rail system 14 is installed on the rack 11, and the sorting cart 12 can travel along the rail in the rail system 14. The logistics boxes 13 are installed on the rack 11, and a plurality of logistics boxes 13 are installed at two sides of the rail system 14 respectively. After the sorting cart 12 loads the package and travels along the rail system 14 to the target logistics box 13 corresponding to the package, the sorting cart 12 can deliver the package to the logistics box 13 to complete this sorting. After the sorting cart 12 has delivered the packages, the sorting cart 12 can return to the bag-feeding place along the rail system 14 to load the packages for the next sorting.

Figure 2:
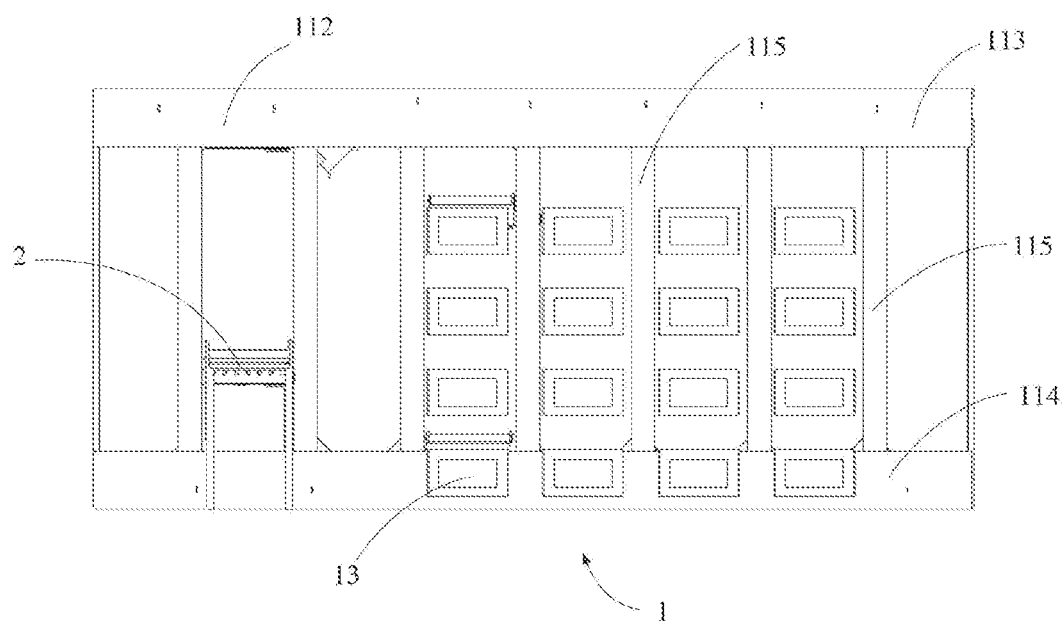
FIG. 2 is a schematic front view of a sorting machine according to an exemplary embodiment.

Referring to FIGS. 1 and 2, the rack 11 may be a frame structure. The rack 11 includes a bottom frame 111 and a side frame 112. The bottom frame 111 is configured in a rectangular frame structure. The bottom frame 111 is preferably configured in a long strip shape. The bottom frame 111 is laid flat on the ground. There are two side frame 112, and the two side frames 112 respectively extend upward from two sides of the bottom frame 111. The two side frames 112 are preferably arranged on the two long sides of the bottom frame 111. The side frame 112 includes a plurality of vertical columns 115. The vertical column 115 is a straight rod and is arranged vertically. A plurality of vertical columns 115 are sequentially arranged along the edge of the bottom frame 111, and the gap between two adjacent vertical columns 115 is equal. The side frame 112 further includes an upper cross beam 113 and a lower cross beam 114. The upper cross beam 113 is arranged horizontally, and the upper cross beam 113 is connected to the top end of each vertical column 115. The lower cross beam 114 is parallel to the upper cross beam 113, and the lower cross beam 114 is connected to the bottom end of each vertical column 115. The two side frames 112 are parallel to each other. A space for installing the rail system 14 and for traveling of the sorting cart 12 is formed between the two side frames 112.

The logistics box 13 is a box structure. The top of the logistics box 13 is open. The logistics box 13 is arranged between two adjacent vertical columns 115, and the two sides of the logistics box 13 are respectively fixed on the two vertical columns 115. A plurality of logistics boxes 13, such as four, can be arranged between two adjacent vertical columns 115. A plurality of logistics boxes 13 between two adjacent vertical columns 115 are successively arranged in a vertical direction, and two adjacent logistics boxes 13 are separated from each other.

Figure 3:
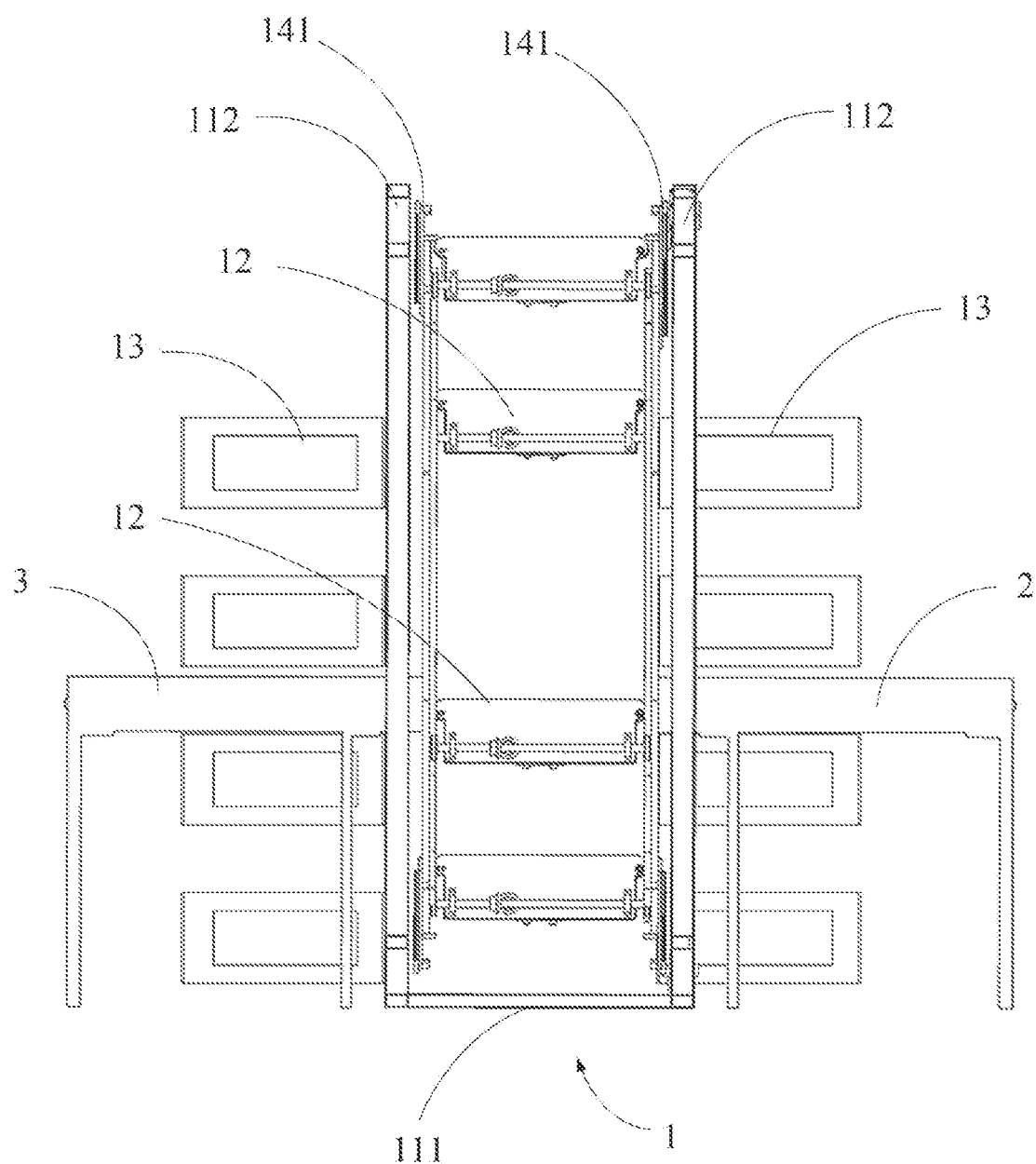
FIG. 3 is a schematic side view of a sorting machine according to an exemplary embodiment.

Referring to FIG. 3, the bag-feeding conveyor 2 is used to transport packages to the sorting cart 12. The bag-feeding conveyor 2 can be installed outside the rack 11 and extends between two adjacent vertical columns 115. When the sorting cart 12 travels near the bag-feeding conveyor 2 and is aligned with the bag-feeding conveyor 2, the bag-feeding conveyor 2 can transport the package to the sorting cart 12. The unloading conveyor 3 is used to receive the packages output by the sorting cart 12. The unloading conveyor 3 can be installed outside the rack 11 and extends between two adjacent vertical columns 115. The unloading conveyor 3 and the bag-feeding conveyor 2 may be symmetrically arranged at two sides of the rack 11.

Figure 4:
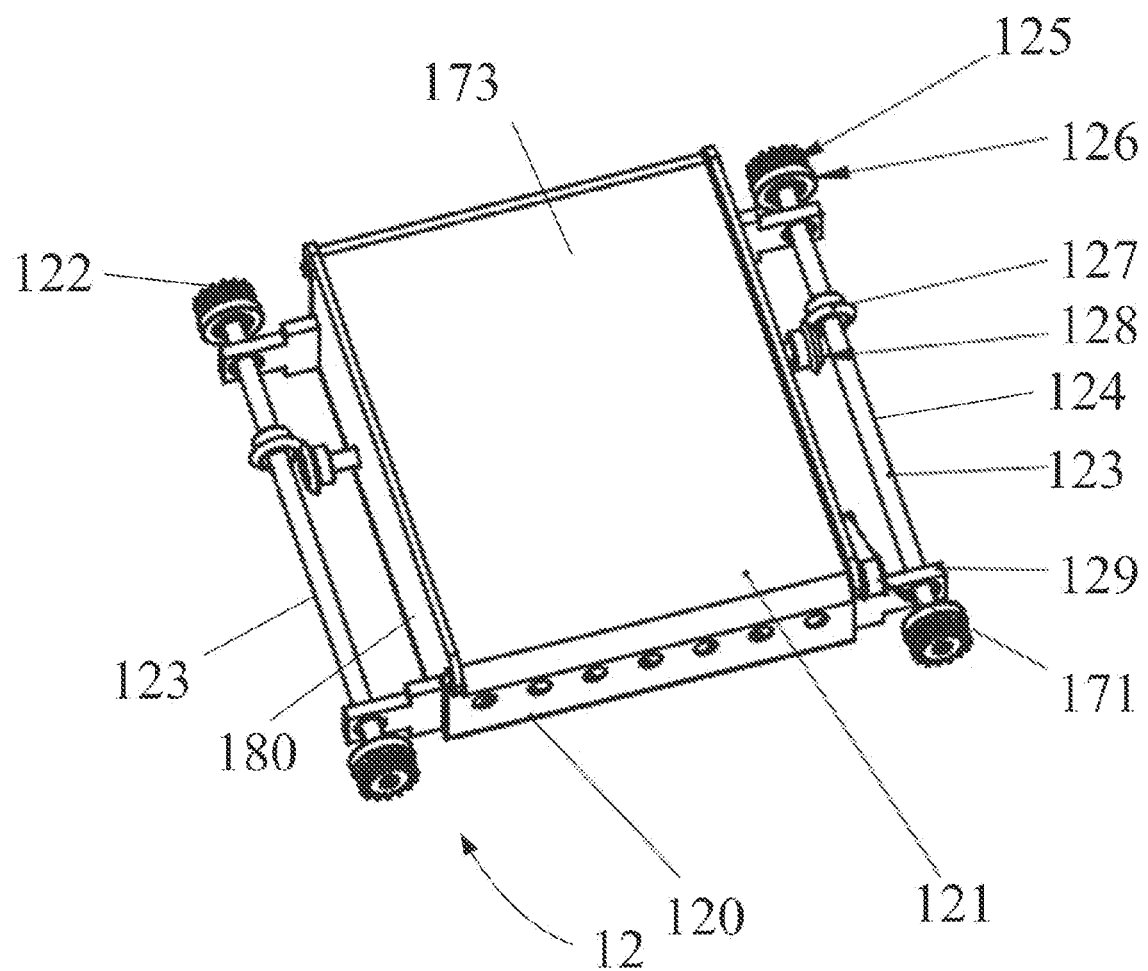
FIG. 4 is a three-dimensional schematic diagram showing a sorting cart according to an exemplary embodiment.
Figure 5:
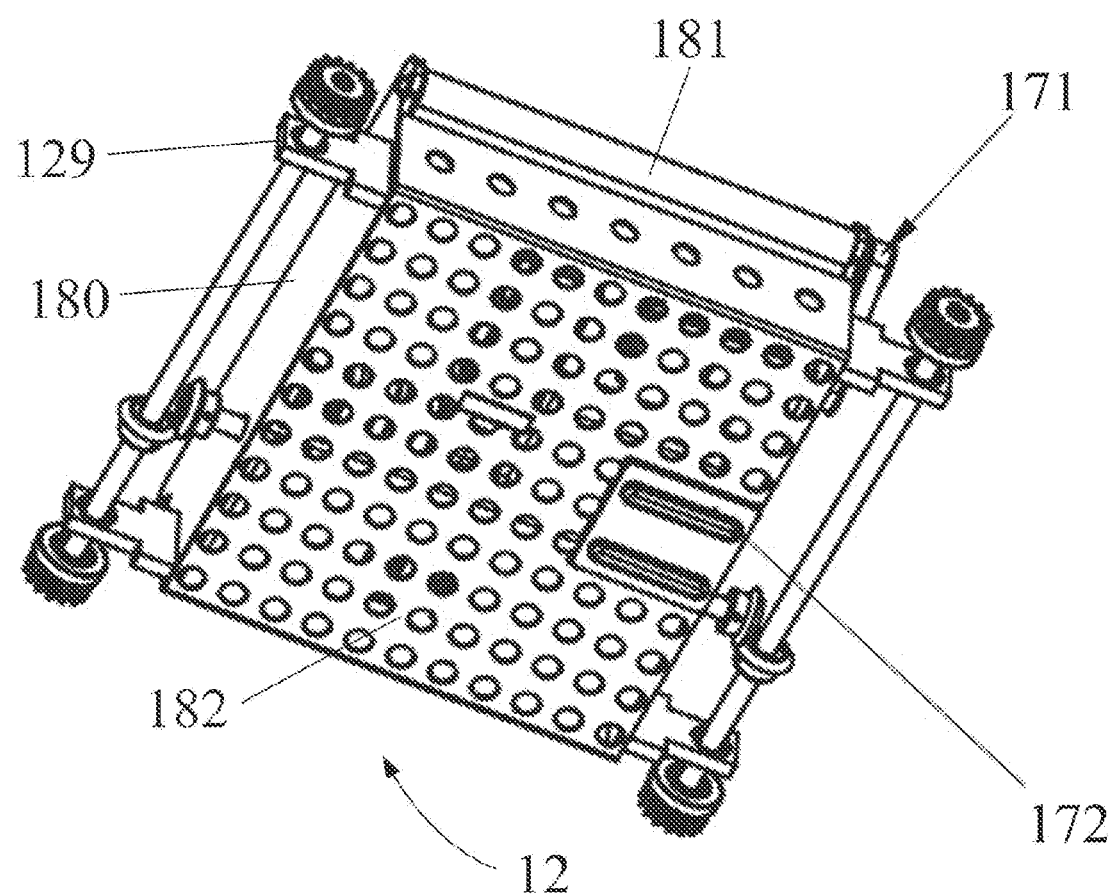
FIG. 5 is a three-dimensional schematic diagram showing a sorting cart according to an exemplary embodiment.
Figure 6:
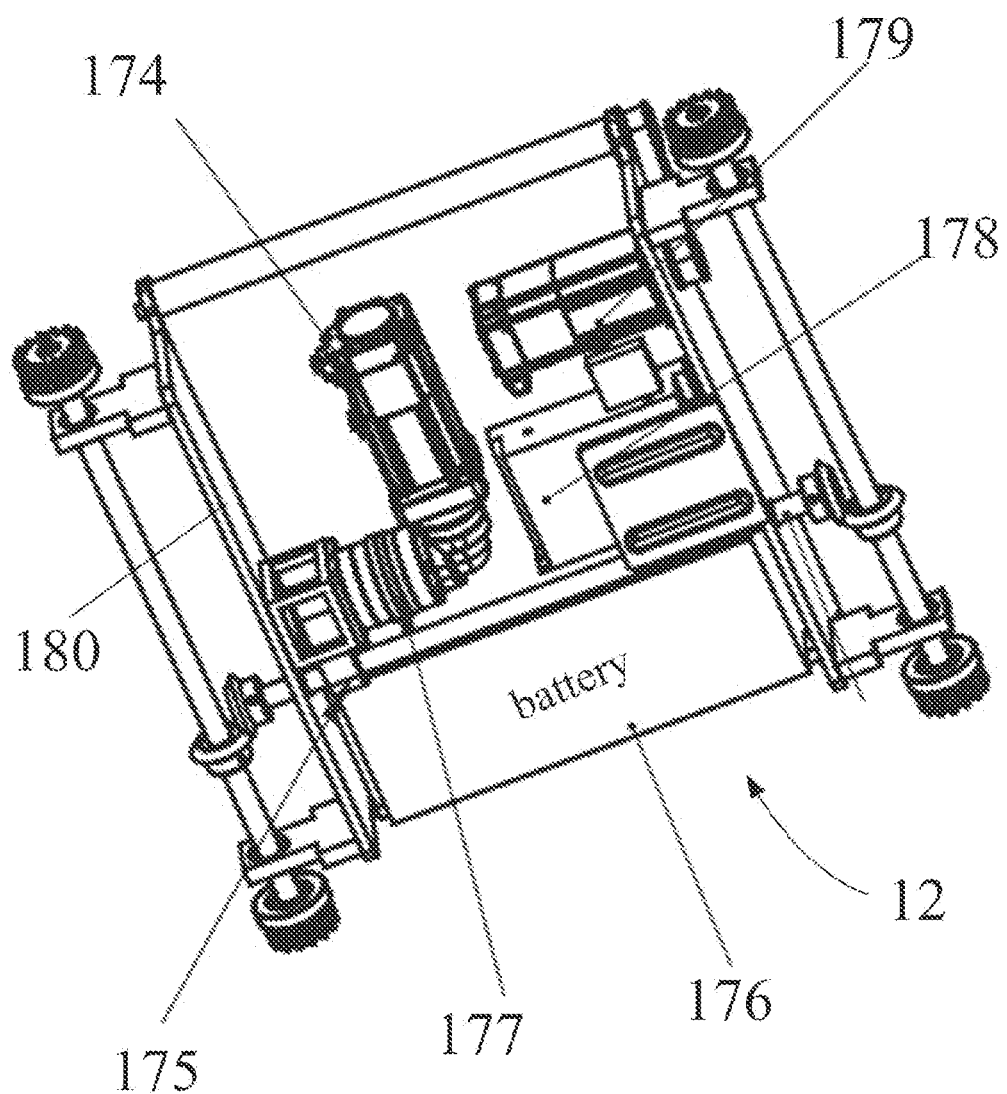
FIG. 6 is a three-dimensional schematic diagram showing a sorting cart according to an exemplary embodiment.

Referring to FIGS. 4-6, the sorting cart 12 may be an automated guided transport vehicle (AGV). The sorting cart 12 includes a frame 120, a conveying assembly 121, a traveling mechanism 122, and a battery 176. The frame 120 is configured in a substantially flat box shape. The frame 120 includes a base plate 182 and two side plates 180. The base plate 182 has a rectangular shape. The two side plates 180 respectively extend from opposite two sides of the base plate 182 to the same side of the base plate 182. The base plate 182 is perpendicular to the side plate 180. The conveying assembly 121 is installed on top of the frame 120. The conveying assembly 121 may be a belt 173 conveyor. The conveying assembly 121 includes a driving roller 181, a driven roller, a belt 173 and a first motor 179. The driving roller 181 and the driven roller are respectively rotatably connected with two opposite side plates 180. Both the driving roller 181 and the driven roller can rotate around their own axis. The belt 173 is looped around the driving roller 181 and the driven roller. The first motor 179 is used to drive the driving roller 181 to rotate. The first motor 179 may be installed inside the frame 120, and the main shaft of the first motor 179 and the driving roller 181 may be connected by a belt.

The traveling mechanism 122 includes two wheel sets, a transmission mechanism and a second motor 174. The two wheel sets are respectively arranged at opposite two sides of the frame 120. The wheel set includes a wheel shaft 123, two crawling gears 125, a first bevel gear 127 and two guide wheels 126. The wheel shaft 123 is rotatably connected to the side plate 180 of the frame. Two bearing seats are arranged on the side plate 180, and bearings are arranged in the bearing seats. The wheel shaft 123 passes through the inner rings of the two bearings. The two guide wheels 126 and the two crawling gears 125 are both sleeved on the wheel shaft 123. The guide wheel 126 is preferably rotatable relative to the wheel shaft 123, and the guide wheel 126 may be a bearing. The crawling gear 125 is fixed with respect to the wheel shaft 123. Two crawling gears 125 are respectively arranged at two ends of the wheel shaft 123. The two guide wheels 126 are arranged between the two crawling gears 125 and are respectively arranged close to the two crawling gears 125. The wheel shafts 123 in the two wheel sets are parallel to each other. The transmission mechanism includes a rotating shaft 175 extending perpendicular to the wheel shaft 123 and two second bevel gears 128 arranged at two ends of the rotating shaft 175. The rotating shaft 175 is rotatably connected to the frame 120. The side plate 180 is also provided with through holes. The rotating shaft 175 can penetrate through the through holes on the two side plates 180 to extend out of the rack 11. Two second bevel gears 128 are respectively fixed at two ends of the rotating shaft 175, and the two second bevel gears 128 are respectively meshed with the two first bevel gears 127. The second motor 174 is used to drive the rotating shaft 175 to rotate, so as to drive the four crawling gears 125 to rotate synchronously. A speed reducer 177 can also be provided between the second motor 174 and the rotating shaft 175 for transmission, to reduce the speed and increase the torque.

The battery 176 is used to power the electrical equipment on the sorting cart 12. In this embodiment, the battery 176 can supply power to the first motor 179 and the second motor 174. The bottom of the sorting cart 12 is also provided with a charging brush, and the charging brush can be used as a charging interface of the sorting cart 12 to connect an external charger, so as to charge the battery 176. A control module 178 is also provided in the frame 120 of the sorting cart 12, and the control module 178 can receive external commands to drive various actuators to perform corresponding actions.

Figure 7:
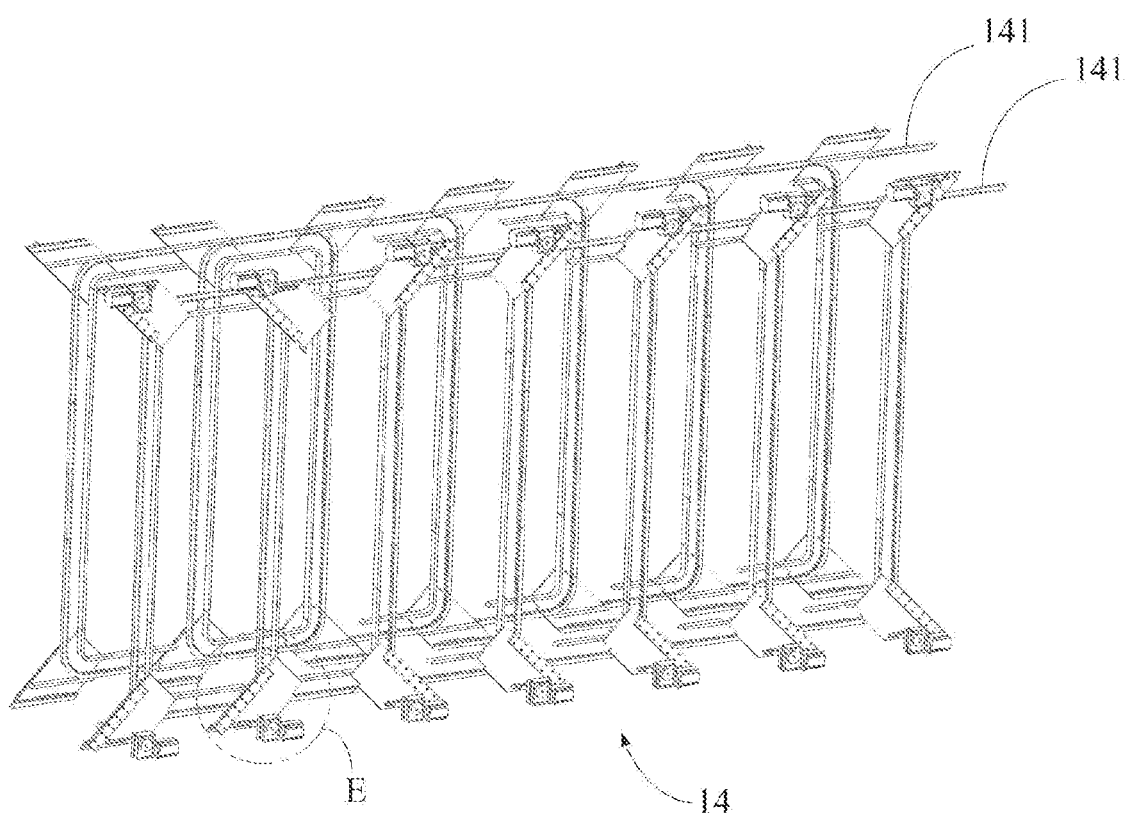
FIG. 7 is a three-dimensional schematic diagram showing a rail system according to an exemplary embodiment.
Figure 8:
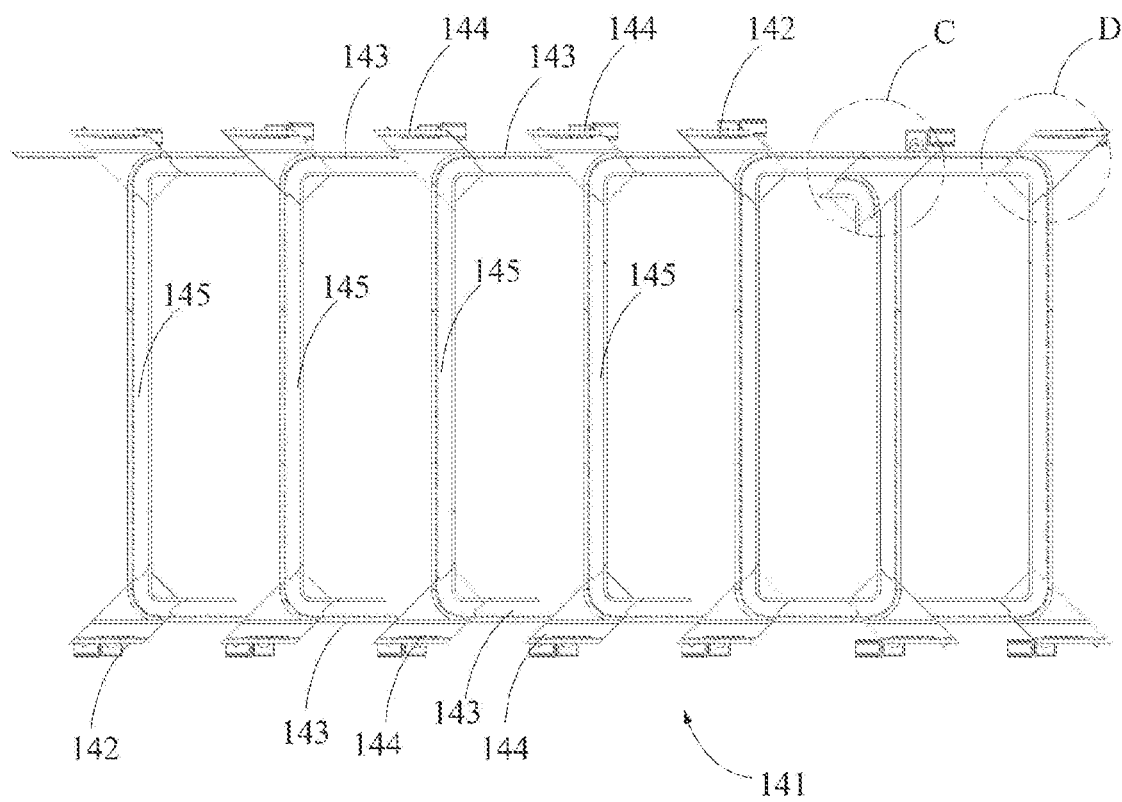
FIG. 8 is a schematic front view showing a rail unit according to an exemplary embodiment.

Referring to FIGS. 3 and 7, the rail system 14 includes two rail units 141. The two rail units 141 are respectively installed on the two side frames 112 and are located between the two side frames 112. The two rail units 141 are arranged symmetrically. Referring to FIG. 8, the rail unit 141 includes a transverse rail assembly 142 and a plurality of vertical rails 145. The transverse rail assembly 142 includes a plurality of transverse rails 143 and a plurality of reversing mechanisms 144. The reversing mechanism 144 and the transverse rail 143 are alternately arranged. The plurality of reversing mechanisms 144 and the plurality of transverse rails 143 are arranged along a straight line. The plurality of transverse rails 143 are parallel and aligned with each other. The plurality of transverse rails 143 are arranged in an intermittent straight line.

The vertical rails 145 and the vertical columns 115 are arranged in a one-to-one correspondence, and each vertical rail 145 is installed on the corresponding vertical column 115 and extends along the vertical column 115. The vertical rail 145 and the vertical column 115 may be screwed, riveted or welded. The distance between every two adjacent vertical rails 145 is equal. The distance between two adjacent vertical rails 145 is equal to the distance between the two axles of the sorting cart 12. The vertical rail 145 is arranged in a one-to-one correspondence with the reversing mechanism 144 in a transverse rail 143 assembly, and one end of the vertical rail 145 extends to the reversing mechanism 144 corresponding to it.

The reversing mechanism 144 is used to switchably connect a transverse rail 143 to one of the transverse rail 143 and the vertical rail 145 adjacent to the transverse rail 143. The crawling gears 125 at two sides of the sorting cart 12 are respectively located in two rail units 141. The two rail units 141 can support the sorting cart 12, such that the sorting cart 12 can travel in the rail system 14. When the reversing mechanism 144 connects the two transverse rails 143, the sorting cart 12 can travel in the horizontal direction; when the reversing mechanism 144 connects the transverse rail 143 and the vertical rail 145, the sorting cart 12 can travel from the transverse rail 143 to the vertical rail 145 through the reversing mechanism 144, and can also travel from the vertical rail 145 to the transverse rail 143. Since the conveyor can be set close to the first pair of vertical rails 145, a group of logistics boxes 13 can be set close to the second pair of vertical rails 145. The sorting cart 12 travels into the first pair of vertical rails 145 and is aligned with the conveyor. The conveyor transports the package to the sorting cart 12, and then the reversing mechanism 144 located at the end of the first pair of vertical rails 145 connects the first pair of vertical rails 145 and the transverse rail 143, and the sorting cart 12 enters the transverse rail 143 through the reversing mechanism 144. The reversing mechanism 144 located at the end of the second pair of vertical rails 145 connects the second pair of vertical rails 145 and the transverse rail 143, and the sorting cart 12 enters the second pair of vertical rails 145 through the reversing mechanism 144, and then aligns one logistics box 13 near the second vertical rail 145, and finally the sorting cart 12 delivers the package into the logistics box 13. Similarly, the sorting cart 12 can also enter the first pair of vertical rails 145 from the second pair of vertical rails 145 to load packages. More than two pairs of vertical rails 145 can be provided in the rail system 14, and at least three pairs of vertical rails 145 can also be provided. When the sorting cart 12 travels transversely on the transverse rail 143, the transverse rail 143 can be connected by the reversing mechanism 144, so that the sorting cart 12 can cross some vertical rails 145 in the middle to reach the target vertical rail 145.

Figure 9:
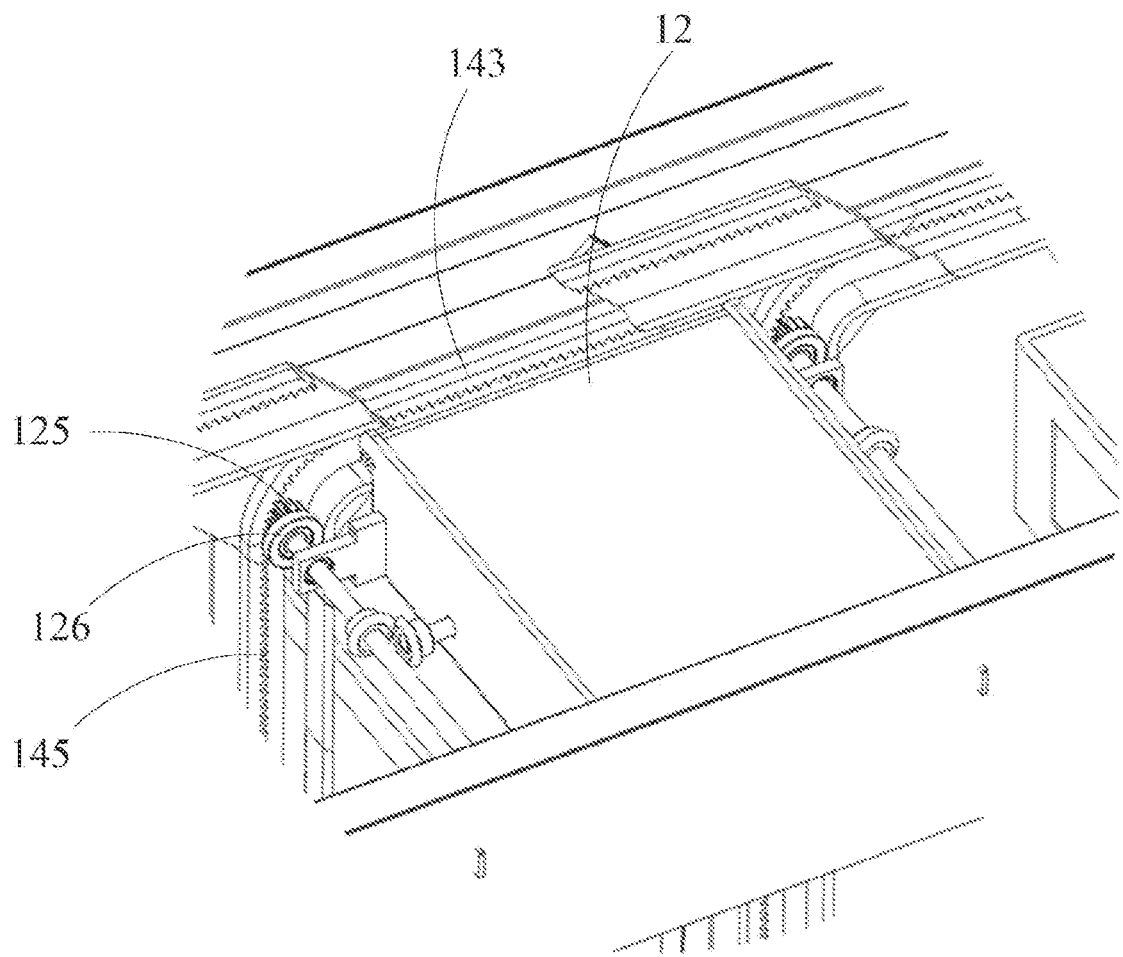
FIG. 9 is a partial enlarged view at A in FIG. 1.
Figure 10:
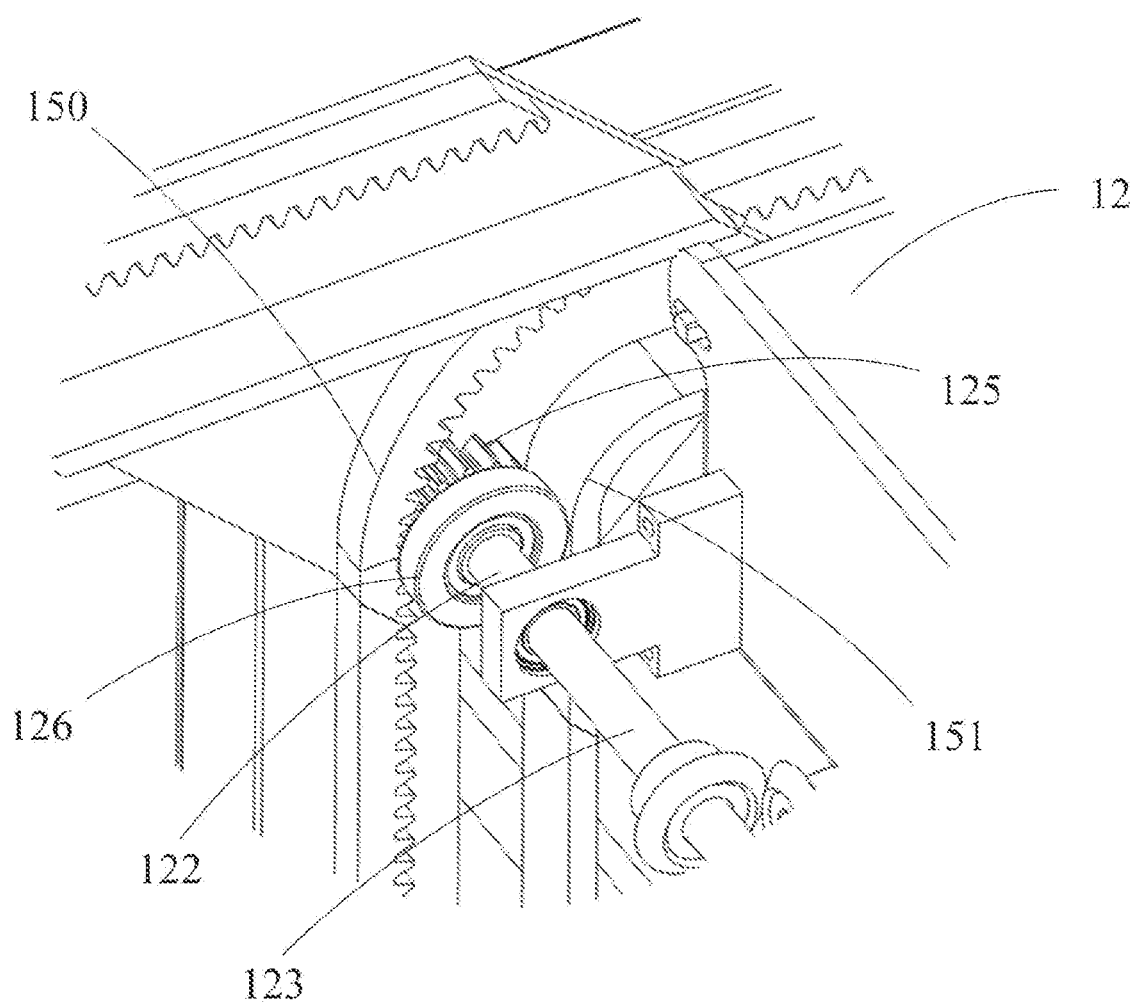
FIG. 10 is a partial enlarged view at B in FIG. 1.
Figure 11:
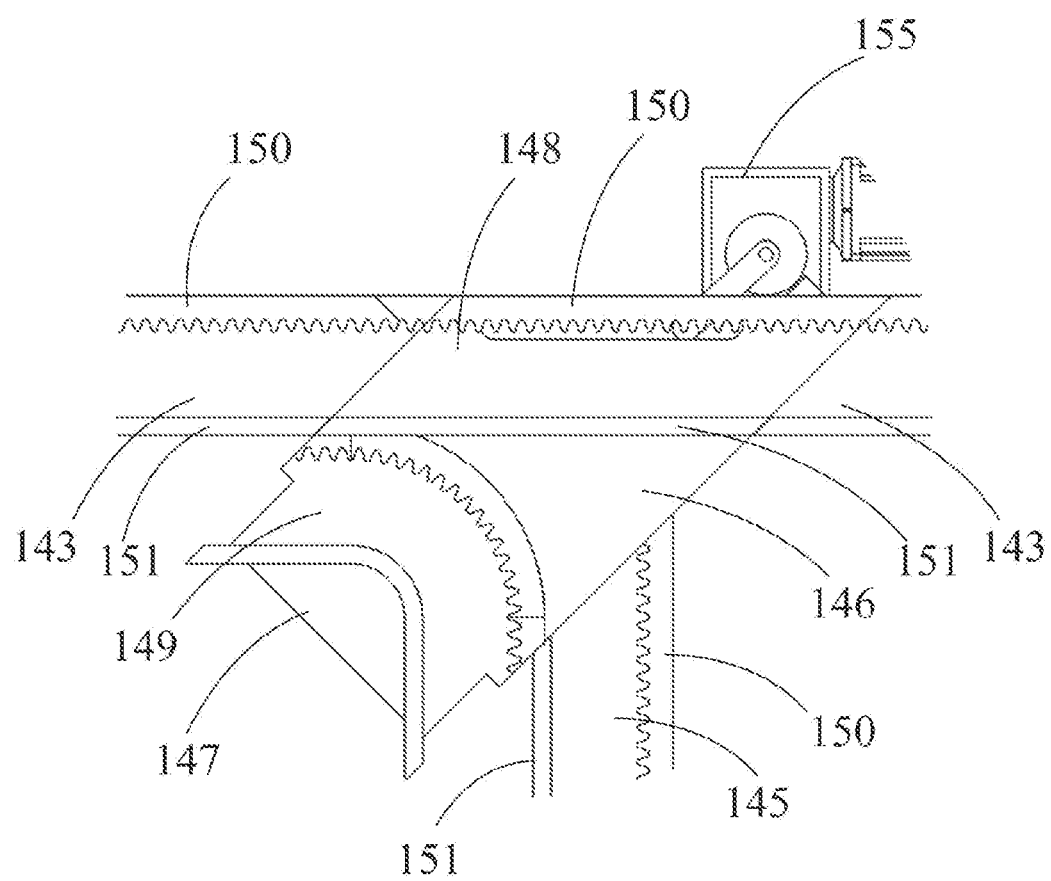
FIG. 11 is a partial enlarged view at C in FIG. 8.
Figure 12:
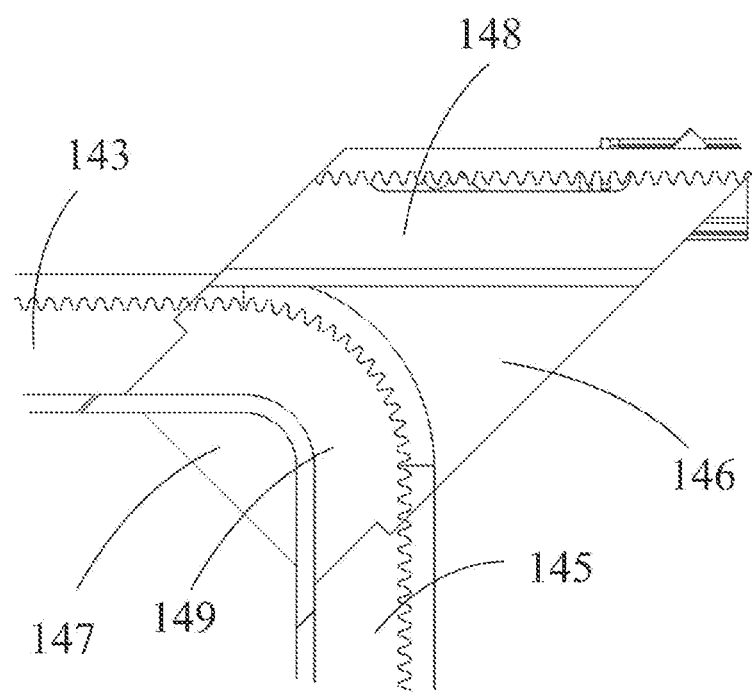
FIG. 12 is a partial enlarged view at D in FIG. 8.

Referring to FIGS. 9 and 10, each rail in the rail unit 141 includes a spline 150 and a limit guide rail 151 parallel to the spline 150. The teeth of the spline 150 face the limit guide rail 151. As for the two rails connected to each other, the spline 150 of one rail is aligned with the spline 150 of the other rail, and the limit guide rail 151 of one rail is aligned with the limit guide rail 151 of the other rail. The crawling gear 125 of the sorting cart 12 extends between the spline 150 and the limit guide rail 151 and meshes with the spline 150. The guide wheel 126 of the sorting cart 12 closely abuts against the limit guide rail 151, so that the crawling gear 125 can closely abut against the spline 150. After the second motor 174 drives the crawling gear 125 to rotate, the crawling gear 125 rolls along the spline 150 to drive the sorting cart 12 to travel along the rail. The width of the limiting rail 151 is wider than the width of the spline 150, so that the spline 150 makes way for the guide wheel 126.

Referring to FIGS. 11-16, the reversing mechanism 144 includes a steering member 146 and a driving mechanism 155. The steering member 146 and the rack 11 are slidably connected, and the steering member 146 can slide along a straight line. The steering member 146 can slide in the gap between two adjacent transverse rails 143 and the gap between a transverse rail 143 and a vertical rail 145. The steering member 146 includes a bottom plate 147, a straight rail 148 and a curved rail 149. The straight rail 148 and the curved rail 149 are arranged on the same surface of the bottom plate 147. The straight rail 148, the curved rail 149, and the bottom plate 147 may be integrally formed workpieces. The straight rail 148 has a straight bar shape and is parallel to the transverse rail 143. The curved rail 149 has a smooth arc structure, preferably a circular arc structure. The direction of one end of the curved rail 149 is parallel to the extending direction of the straight rail 148, and the direction of the other end of the curved rail 149 is perpendicular to the extending direction of the straight rail 148 and away from the straight rail 148. The curved rail 149 and the straight rail 148 are arranged successively along the sliding direction of the bottom plate 147. When the steering member 146 slides towards one direction, two ends of the straight rail 148 can be connected to the two adjacent transverse rails 143, and when the steering member 146 slides towards the other direction, two ends of the curved rail 149 can be connected to the transverse rail 143 and the vertical rail 145 respectively.

Figure 13:
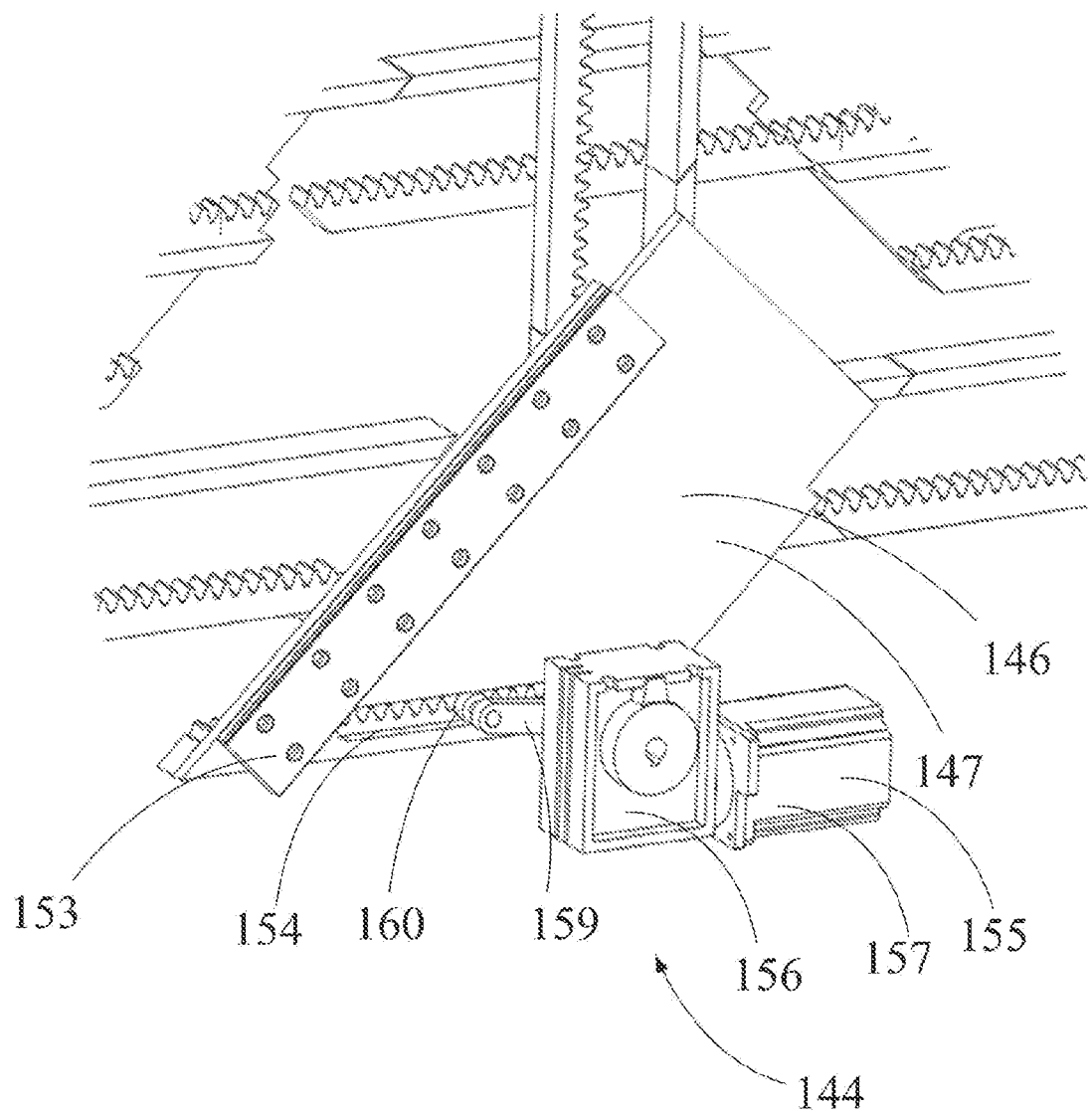
FIG. 13 is a partial enlarged view of E in FIG. 7.
Figure 14:
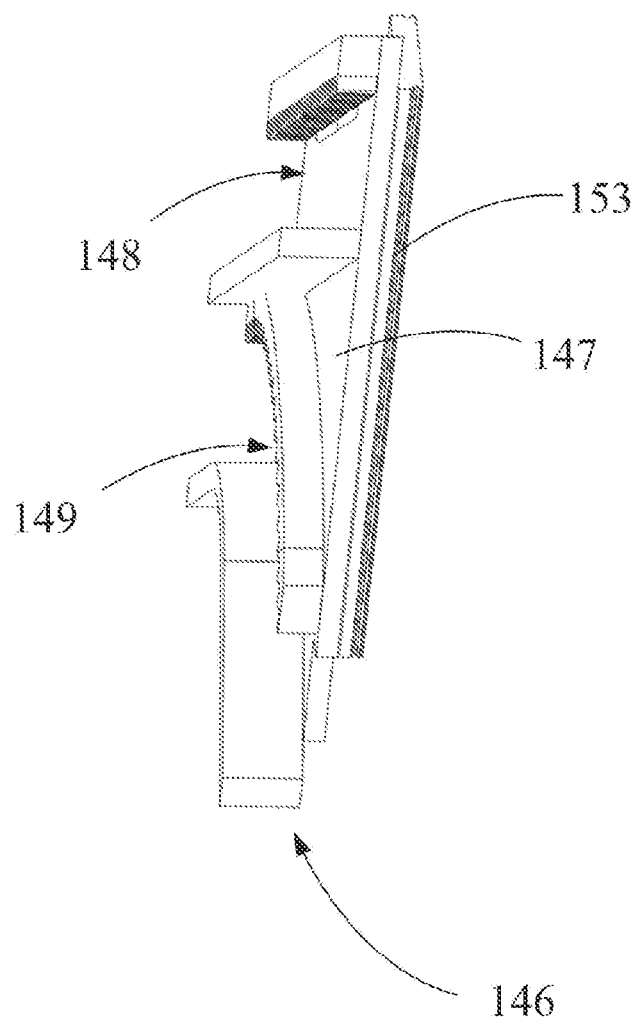
FIG. 14 is a three-dimensional schematic diagram showing a steering member according to an exemplary embodiment.
Figure 15:
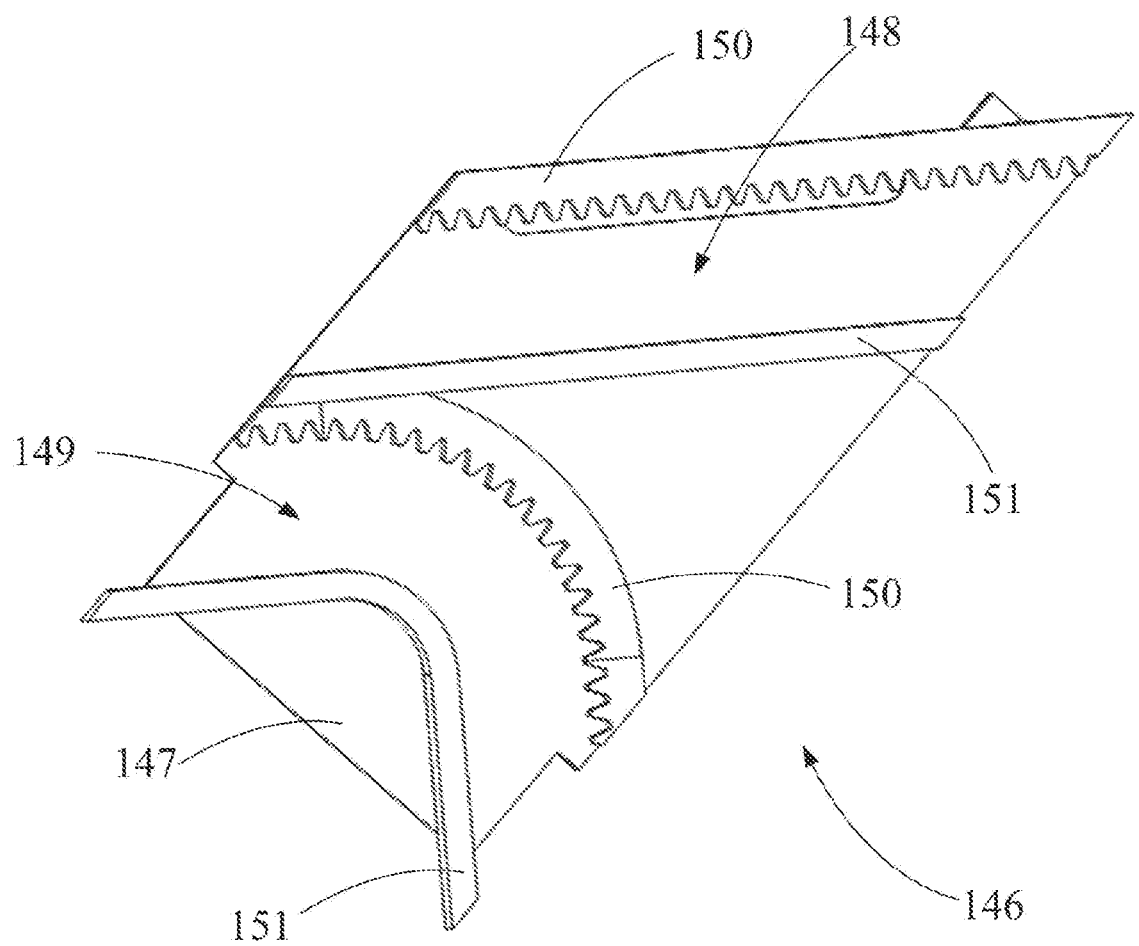
FIG. 15 is a three-dimensional schematic diagram showing a steering member according to an exemplary embodiment.

Referring to FIG. 13, the linear guide rail 153 is installed on the other surface of the bottom plate 147. The linear guide rail 153 and the bottom plate 147 can be connected by screws or bolts, or can be welded or bonded. The side of the linear guide rail 153 away from the bottom plate 147 is provided with a dovetail part, and the rack 11 is provided with a dovetail groove extending linearly. The dovetail part is embedded in the dovetail groove and can slide along the dovetail groove. In this way, a sliding connection is formed between the bottom plate 147 and the rack 11. The sliding connection is not limited to the manner in this embodiment. For example, a straight rail is provided on the rack 11, and a sliding block that can slide along the rail is provided on the rail, and then installing the bottom plate 147 on the sliding block can also form a sliding connection between the rack 11 and the bottom plate 147.

Furthermore, a slot 160 is also provided on the bottom plate 147. The slot 160 has a straight shape. The slot 160 can be a strip-shaped through hole penetrating the bottom plate 147, or can be a groove formed by the bottom plate 147 recessing away from the surface of the straight slot 160. The extending direction of the slot 160 is not the same as the sliding direction of the bottom plate 147. The extending direction of the slot 160 is preferably the same as the extending direction of the straight rail 148. The slot 160 may be located at the bottom area of the slot 160.

Figure 16:
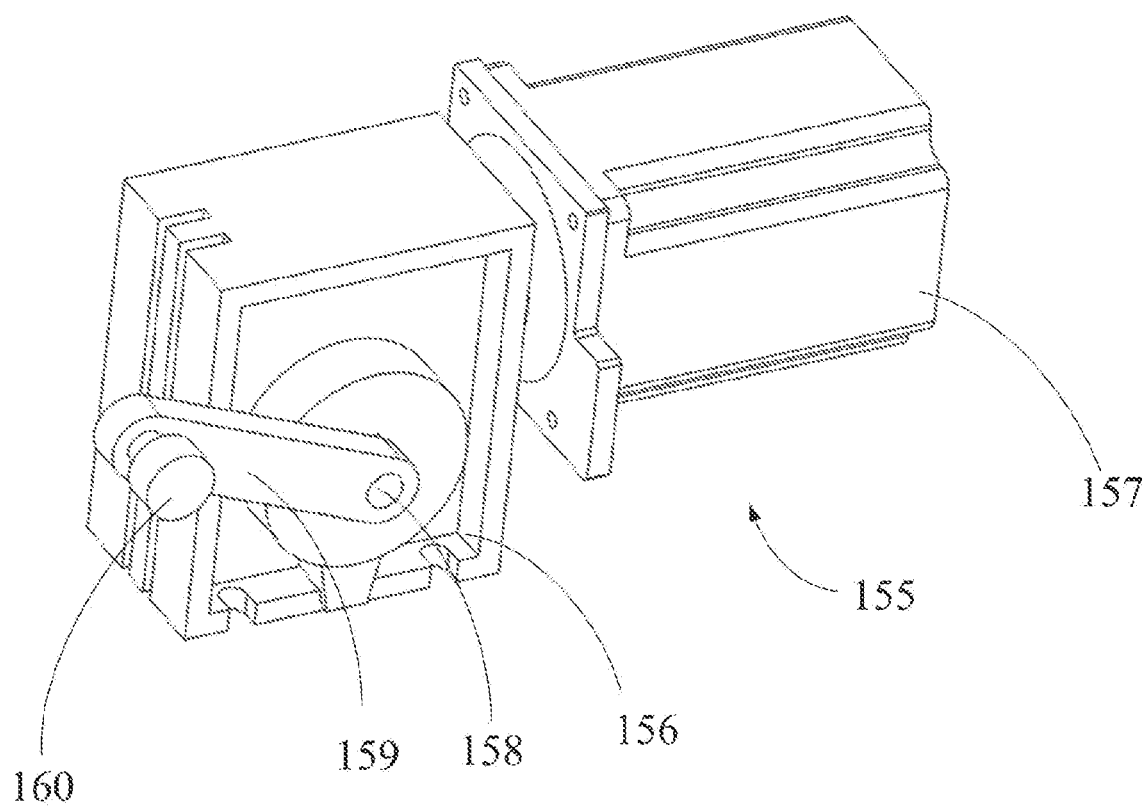
FIG. 16 is a three-dimensional schematic diagram showing a driving mechanism according to an exemplary embodiment.

Referring to FIG. 16, the driving mechanism 155 includes a speed reducer 156, a third motor 157, a pendulum rod 159 and a pendulum wheel 160. The speed reducer 156 is installed on the rack 11. The third motor 157 is installed on the speed reducer 156. The third motor 157 may also be installed on the rack 11. The speed reducer 156 includes an input shaft and an output shaft 158, and the torque input from the input shaft can be output from the output shaft 158. The speed reducer 156 plays a role of reducing the speed and increasing the torque. The main shaft of the third motor 157 is drivingly connected with the input shaft of the speed reducer 156. The pendulum rod 159 is a straight rod. One end of the pendulum rod 159 is connected to the output shaft 158 of the speed reducer 156, and the other end of the pendulum rod 159 is connected to the pendulum wheel 160. The pendulum rod 159 and the output shaft 158 of the speed reducer 156 are perpendicular to each other. The output shaft 158 of the speed reducer 156 can drive the pendulum rod 159 to swing. The shaft of the pendulum wheel 160 is fixedly connected to the pendulum rod 159, and the shaft of the pendulum wheel 160 is parallel to the output shaft 158 of the speed reducer 156. The pendulum wheel 160 can rotate about its axis. The pendulum wheel 160 is arranged in the slot 160, and the pendulum wheel 160 swings under the drive of the pendulum rod 159 to roll along the side wall of the slot 160.

In this way, the main shaft of the third motor 157 rotates in one direction, to drive the speed reducer 156 to drive the pendulum rod 159 to swing. After the pendulum rod 159 swings, it can then drive the pendulum wheel 160 to swing in one direction, and the pendulum wheel 160 can in turn drive the bottom plate 147 to slide in one direction. Conversely, when the main shaft of the motor rotates in another direction, the pendulum wheel 160 swings in the opposite direction, which in turn drives the bottom plate 147 to slide in the opposite direction.

It can be understood that the driving mechanism 155 can also be designed as a telescopic mechanism, for example, a hydraulic cylinder, an electric cylinder or a pneumatic cylinder. The telescopic direction of the telescopic mechanism is the same as the sliding direction of the bottom plate 147. The telescopic mechanism drives the bottom plate 147 to slide through the telescopic motion.

Further, the end surface of the transverse rail 143 and the end surface of the straight rail 148 are inclined surfaces parallel to each other, and the end surface of the transverse rail 143 and the end surface of the straight rail 148 are both parallel to the sliding direction of the bottom plate 147.

Since the end surface of the transverse rail 143 and the end surface of the straight rail 148 are inclined planes parallel to each other, when the transverse rail 143 and the straight rail 148 are connected to each other, the gap between the transverse rail 143 and the straight rail 148 is very small, the sorting cart 12 can be more stable when traveling the gap between them two. At the same time, since the two inclined surfaces are both parallel to the sliding direction of the bottom plate 147, the two inclined surfaces are closely matched during the sliding process of the bottom plate 147.

Further, the included angles between the sliding direction of the bottom plate 147 and the extending direction of the vertical rail 145, the extending direction of the transverse rail 143 respectively are the same. That is, the included angle between the sliding direction of the bottom plate 147 and the vertical rail 145 is the same as the included angle between the sliding direction of the bottom plate 147 and the transverse rail 143. When the included angle between the transverse rail 143 and the vertical rail 145 is 90°, the included angle between the sliding direction of the bottom plate 147 and the transverse rail 143 is 45°, and the included angle between the sliding direction of the bottom plate 147 and the vertical rail 145 is 45°.

The advantage of this arrangement is that the sliding distance of the bottom plate 147 can be reduced, which makes the entire reversing mechanism 144 more compact.

Further, the straight rail 148 and the curved rail 149 are respectively provided at two ends of the bottom plate 147. The straight rail 148 is provided at one end of the bottom plate 147 away from the vertical rail 145, and the curved rail 149 is provided at one end of the bottom plate 147 close to the vertical rail 145.

Since the straight rail 148 and the curved rail 149 are respectively provided at two ends of the bottom plate 147, and the curved rail 149 is provided at the end of the bottom plate 147 close to the vertical rail 145, the size of the bottom plate 147 can be reduced, and the sliding distance of the bottom plate 147 can be shortened, which further makes the reversing mechanism 144 more compact.

Further, the transverse rail assembly 142 is provided with two sets, and the vertical rail 145 is disposed between the two sets of transverse rail assemblies 142. The two sets of transverse rail assemblies 142 are arranged in mirror symmetry. Two reversing mechanisms 144 aligned with each other in each set of the transverse rail assembly 142 are arranged corresponding to one vertical rail 145. The two ends of the vertical rail 145 respectively extend to the vicinity of the corresponding reversing mechanism 144 in the two sets of transverse rail assemblies 142.

The two transverse rail 143 assemblies are arranged at opposite two ends of a plurality of vertical rails 145, so that the route of the sorting cart 12 traveling in the rail system 14 can be a circular route. For example, after loading the package from the conveyor, the sorting cart 12 travels transversely to the target vertical rail 145 through one of the transverse rail 143 assemblies, and then puts the package into the logistics box on the target vertical rail 145, and then travels transversely from the other transverse rail 143 assembly to the conveyor for loading. In this way, one sorting machine 1 can be equipped with a plurality of sorting carts 12, all the sorting carts 12 travel in a clockwise or counter-clockwise circular route, the mutual interference between the sorting carts 12 is small, and the sorting efficiency is greatly improved.

Furthermore, the transverse ends of the curved rails 149 at two ends of the vertical rail 145 that are close to the conveyor are arranged opposite to the transverse ends of the other curved rails 149. In this way, the operating route of the sorting cart 12 is a quadrangular circular route with rounded corners, and the sorting cart 12 has a higher operating efficiency.

It should be noted that as long as the four crawling gears 125 rotate synchronously, the sorting cart 12 can be driven to operate. For example, two motors can be used to drive two wheel shafts 123 to rotate at the same time.

It can be seen from the above technical solutions that the advantages and positive effects of the sorting machine of the present disclosure are as follows.

The sorting cart can travel horizontally along the transverse rail and vertically along the vertical rail on the guide rail unit, and can also change lanes through the reversing mechanism connecting the transverse rail and the vertical rail. In this way, the sorting cart can load packages from one vertical rail and transport the packages to another target vertical rail for package delivery, to complete the sorting, and at the same time, it can also return from the target vertical rail to the position where the packages are loaded. The sorting machine has a complete sorting function. In particular, the sorting machine is arranged vertically as a whole and has a small occupied area.

Although the present disclosure has been disclosed with reference to certain embodiments, various variations and modifications can be made to the described embodiments without departing from the scope and extent of the present disclosure. Therefore, it should be understood that the present disclosure is not limited to the illustrated embodiments, and its protection scope should be defined by the content of the appended claims and their equivalent structures and solutions.

What is claimed is:

1. A sorting machine, comprising: a rack, two rail units both installed on the rack and symmetrical to each other, and a sorting cart;

the rail unit comprising:
a transverse rail assembly, the transverse rail assembly comprising a plurality of transverse rails and a plurality of reversing mechanisms, wherein the transverse rail and the reversing mechanism are alternately arranged along a straight line, and the plurality of transverse rails are flush with each other; and
a plurality of mutually parallel vertical rails, wherein the vertical rails and the reversing mechanisms are arranged in a one-to-one correspondence, and one end of the vertical rail extends to the corresponding reversing mechanism;

the sorting cart comprising:
a frame arranged between the two rail units;
a traveling mechanism installed on the frame and capable of traveling along the transverse rail and the vertical rail of two rail units;
a conveying assembly arranged above the frame and capable of carrying and conveying articles,
wherein, the reversing mechanism is used to switchably connect one transverse rail to one of the transverse rail and the vertical rail adjacent to the transverse rail, the sorting cart switches rails through the reversing mechanism, and a conveying direction of the conveying assembly is different from a traveling direction of the sorting cart, wherein the reversing mechanism comprises:
a steering member, comprising a bottom plate slidably connected to the rack and a straight rail and a curved rail arranged on an identical surface of the bottom plate;
a driving mechanism configured to drive the steering member to slide;
wherein, the curved rail and the straight rail are successively arranged along a sliding direction of the bottom plate, the straight rail is parallel to the transverse rail and capable of connecting two adjacent transverse rails, the curved rail is capable of connecting adjacent one transverse rail and one vertical rail.

2. The sorting machine according to claim 1, wherein the transverse rail assembly is provided with two sets, and the vertical rail is provided between two sets of the transverse rail assemblies and two ends thereof respectively extend to the reversing mechanisms of the two sets of the transverse rail assemblies.

3. The sorting machine according to claim 1, wherein an included angle between the sliding direction of the bottom plate and an extending direction of the vertical rail is equal to an included angle between the sliding direction of the bottom plate and the extending direction of the transverse rail.

4. The sorting machine according to claim 1, wherein an end surface of the transverse rail and an end surface of the straight rail are inclined surfaces parallel to each other, and the end surface of the transverse rail and the end surface of the straight rail are both parallel to the sliding direction of the bottom plate.

5. The sorting machine according to claim 1, wherein the straight rail and the curved rail are respectively arranged at two ends of the bottom plate, and the curved rail is arranged at one end of the bottom plate close to the vertical rail.

6. The sorting machine according to claim 1, wherein the reversing mechanism further comprises:
a linear guide rail, installed between the rack and the bottom plate, and configured to guide the bottom plate to slide along a straight line.

7. The sorting machine according to claim 1, wherein the bottom plate is provided with a slot that is not parallel to a sliding direction of the steering member;
the driving mechanism comprises:
a speed reducer, comprising an input shaft and an output shaft;
a third motor, comprising a main shaft that is drivingly connected to the input shaft;
a pendulum rod, having one end vertically connected to the output shaft;
a pendulum wheel, installed at the other end of the pendulum rod and located in the slot, and capable of rolling along the slot;
wherein, when the pendulum rod drives the pendulum wheel to swing, the pendulum wheel is capable of driving the steering member to slide.

8. The sorting machine according to claim 1, wherein the curved rail is a smooth arc, and one end of the curved rail faces a direction parallel to an extending direction of the straight rail, the other end of the curved rail faces a direction perpendicular to the extending direction of the straight rail and away from the straight rail.

9. The sorting machine according to claim 1, wherein each rail in the rail unit comprises a spline and a limit guide rail parallel to the spline;
the traveling mechanism comprises a plurality of wheel sets, and each of the wheel sets comprises a crawling gear that is capable of actively rotating and a guide wheel arranged next to the crawling gear and coaxial with a preset crawling gear;
wherein, the crawling gear is arranged between the spline and the limit guide rail, and the crawling gear is meshed with the spline and is capable of rolling along the spline, and the guide wheel is capable of rolling along the limit guide rail.

10. The sorting machine according to claim 9, wherein a width of the spline is smaller than a width of the limit guide rail, so as to make way for the guide wheel.

11. The sorting machine according to claim 9, wherein each of the wheel sets further comprises a wheel shaft, and the wheel shafts are parallel to each other;
each wheel set has two crawling gears and two guide wheels, the two crawling gears are respectively arranged at two ends of the wheel shafts, and two guide wheels are arranged between the two crawling gears and are respectively close to the two crawling gears;
the traveling mechanism further comprises a second motor for driving a plurality of the wheel shafts to rotate synchronously.

12. The sorting machine according to claim 1, wherein the transverse rail is arranged horizontally, and the vertical rail is arranged vertically.

13. The sorting machine according to claim 1, wherein the sorting machine further comprises a plurality of logistics boxes arranged on the rack, and a plurality of the logistics boxes are arranged on a side of the vertical rail away from the sorting cart.

14. The sorting machine according to claim 2, wherein the reversing mechanism comprises:
a steering member, comprising a bottom plate slidably connected to the rack and a straight rail and a curved rail arranged on an identical surface of the bottom plate;
a driving mechanism configured to drive the steering member to slide;
wherein, the curved rail and the straight rail are successively arranged along a sliding direction of the bottom plate, the straight rail is parallel to the transverse rail and capable of connecting two adjacent transverse rails, the curved rail is capable of connecting adjacent one transverse rail and one vertical rail.

15. The sorting machine according to claim 2, wherein the transverse rail is arranged horizontally, and the vertical rail is arranged vertically.

16. The sorting machine according to claim 2, wherein the sorting machine further comprises a plurality of logistics boxes arranged on the rack, and a plurality of the logistics boxes are arranged on a side of the vertical rail away from the sorting cart.

* * * * *